United States Patent Office 3,524,924
Patented Aug. 18, 1970

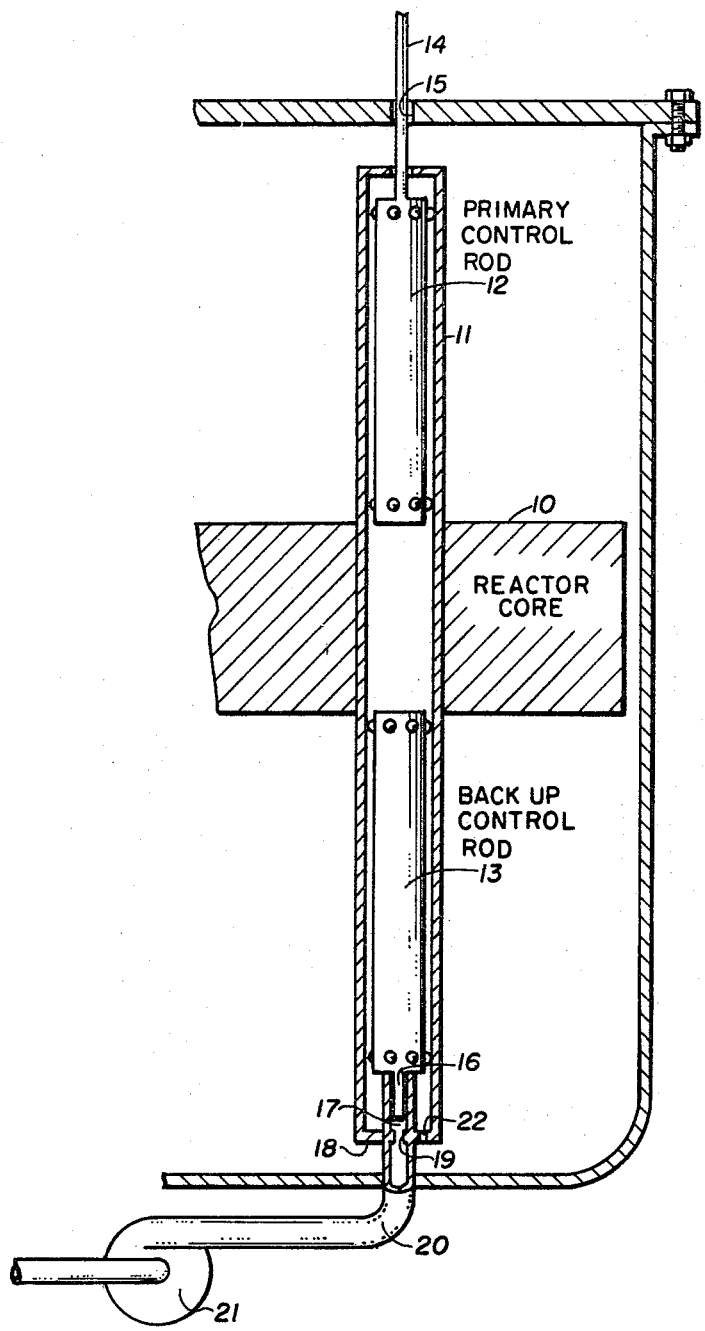

3,524,924
BACKUP CONTROL ROD SYSTEM
John H. Germer, San Jose, Calif., assignor to the United States of America as represented by the United States Atomic Energy Commission
Filed July 16, 1968, Ser. No. 745,262
Int. Cl. G21c 7/16
U.S. Cl. 176—36         6 Claims

ABSTRACT OF THE DISCLOSURE

A backup control rod arrangement which functions to shut down a nuclear reactor in the event of failure of the primary control system. During normal operation of the reactor, the backup control rod is maintained in a position beneath the reactor core by suction produced by an electro-magnetic pump or the like. Upon failure of the primary control system or other desired shut down of the reactor, the pump is reversed or inactivated and the control rod is allowed to float upwardly into the reactor core due to the backup rod being less dense than the coolant in the core, which, for example, may be sodium. In addition, the reverse flow of fluid from the electromagnetic pump may be utilized to force the backup rod into the core.

BACKGROUND OF THE INVENTION

The invention described herein was made in the course of, or under, Subcontract No. W-31-109-38-1997 under AEC Contract No. W-31-109-ENG-38, with the United States Atomic Energy Commission.

As well known, nuclear reactors are provided with means for regulating or controlling a self-sustaining chain reaction within the reactor core, and this is ordinarily achieved by moving control rods of neutron-absorbing material into and out of the core. As a safety device, it is imperative that such control rod regulating means include means whereby a sufficient number of the neutron-absorbing control rods are substantially instantaneously moved into the core upon development of a dangerous neutron level or other reasons requiring a shut down of the reactor. This frequently is referred to as "scramming" the reactor. Various prior art means have been devised for providing this essential safety precaution. These prior approaches have included the movement of the control rods by gravity upon failure of fluid pressure, such as the coolant fluid; direct movement of the control rods by means activated by a signal such as the loss of coolant or a dangerous neutron level within the core; or movement of the control rods by pressure responsive mechanisms, as exemplified by U.S. Pat. No. 3,031,397. While these prior approaches have been effective, failure of these control rod activating means leaves the reactor without control therefor, and thus produces a safety hazard.

SUMMARY OF THE INVENTION

The present invention provides an emergency shutdown apparatus wherein a backup control rod is inserted into the reactor core in the event of the primary control rod's failure to move in a scram situation, thereby providing a desirable safety feature over the prior known control rod systems.

Therefore, it is a primary object of this invention to provide a control rod system for a nuclear reactor.

A further object of the invention is to provide a backup control rod system which functions to shut down a reactor in the event of failure of the primary control system.

Another object of the invention is to provide a backup control rod which may be inserted into a reactor core due to the buoyant force of the coolant acting on the control rod during a scram situation.

Another object of the invention is to provide a backup control rod system which is normally held withdrawn from the reactor core by suction of pumping apparatus, and which is allowed to move into the reactor core by removal of the suction thereon or by reversal of the pumping apparatus.

Other objects of the invention will become readily apparent from the following description and accompanying drawing wherein:

BRIEF DESCRIPTION OF THE DRAWING

The single figure is a view partially in cross-section of an embodiment of the inventive backup control rod system.

DESCRIPTION OF THE INVENTION

As pointed out above, the present invention provides a desirable safety feature in a nuclear reactor by the incorporation into the prior control rod systems of a control rod which can shut down the reactor in the event of failure of the primary control system. As shown in the figure, the inventive backup control system is incorporated in a nuclear reactor having a core indicated generally at 10 which as known in the art is located within a vessel and is provided with a plurality of fuel elements, and through which coolant such as sodium flows. Since the present invention is not directed to the reactor core, fuel elements, or coolant system, a description and illustration of the details thereof is deemed unnecessary, since these features are well known in the art. Also, as known in the art, the reactor core 10 is provided with a number of control rod assemblies which are actuated by a primary control system. Only one of such control rod assemblies is illustrated in the drawing in a modified form in accordance with the invention and comprises a guide tube 11 which extends through the core 10 and outwardly approximately one core length on the top and bottom of the core to normally house a primary control rod 12 and a backup control rod 13 in the positions shown.

As known in the art, the primary control rod 12 is moved via drive shaft 14, which extends through aperture 15 in guide tube 11, by a control system (not shown) to insert rod 12 into core 10 or remove rod 12 from core 10 depending on the operating conditions and requirements of the reactor. The control system for primary control rod 12 may be of the hydraulic, pneumatic, or electric type. Primary control rod 12 contains neutron absorbing material and is operated via the top-mounted drive system via shaft 14 whereby vertical translation of the control rod drive shaft 14 moves the control rod 12 from a position above the reactor core 10, as shown in the drawing, for minimum neutron absorption by control rod 12, to a position of maximum neutron absorption in the middle of the core 10, for reactor shut down. Also, if desired, and as commonly known, the control rod 12 can be partially moved into the reactor core 10 for controlling the operation of the reactor.

The backup control rod 13 is similar to the primary control rod 12, except that it constructed from materials which is sufficiently light in weight to be buoyant in the coolant, which in this embodiment is liquid sodium, and is free floating (not connected to a drive shaft). A piston 16 is secured to or integral with the lower end of backup control rod 13 and is normally located within an upwardly projecting cylinder 17 formed in the closed end 18 of guide tube 11. An aperture 19 in the closed guide tube end 18 provides fluid communication between cylinder 17 and a conduit means 20 secured at one end to guide tube 11 and at the other end to a reversible electromagnetic pump 21. In addition, the closed end 18 of guide tube 11 is provided with at least one coolant orifice 22, whereby coolant can flow through guide tube 11 via orifice 22 and aperture 15.

During normal opeartion of the reactor, the backup control rod 13 is in the down position, as shown in the drawing, and is held, such that piston 16 is positioned within cylinder 17, by suction on the piston 16 produced by the electromagnetic pump 21. In this position there is no interference with the operation of the primary control rod 12. Scram action of the backup control rod 13 is initiated by either inactivation or reversal of the electromagnetic pump 21. Upon inactivation of the pump 21, the suction force on piston 16 is removed whereby, due to the buoyancy of the control rod 13, the rod 13 floats upwardly in guide tube 11 until it contacts the lower end of the primary control rod 12, thereby being positioned within core 10 to provide maximum neutron absorption, thus causing the shut down of the reactor. In the case of pump 21 being reversed, the control rod 13 is forced upwardly by the pressure generated in cylinder 17 by pump 21 such that piston 16 is forced out of cylinder 17 whereby rod 13 floats upward to the mid-position in core 10 for reactor shut down.

Return of the backup control rod 13 to its normal or lower position in guide tube 11 is initiated by lowering the primary control rod 12 to push rod 13 down, wherein it can again be held down by the suction of electromagnetic pump 21 on piston 16 within cylinder 17.

The suction capacity of the electromagnetic pump or other suction device should be insufficient to lower the control rod without having it pushed down by the primary control rod. This prevents accidentally withdrawing a backup control rod without going through the above procedure.

While apparatus for initiating the reversal or inactivation of the electromagnetic pump 21 has not been shown, it may, as known in the art, be of the type responsive to a predeterimnd neutron level in the reactor or a predetermined coolant level of the core 10, similar to the manner in which the drive mechanism for the primary control rod is activated.

In the event that the primary control rod 12 scrams, the initiating mechanism for the backup control rod 13 may also be simultaneously activated if desired. In such a case the speed of the primary rod 12 will be such that it will prevent the backup rod 13 from achieving full stroke, rod 13 not being needed in such case but having been activated in the case that a full downward stroke or movement of the primary control rod 12 is not accomplished, thus assuring faster operation of the backup control rod 13.

If desired, the electromagnetic pump 21 can be utilized to control a plurality of backup control rods similarly mounted throughout the reactor core 10.

It is thus seen that it is possible to operate the novel backup control rod system in any of the following modes of operation:

(1) Initiate only after sensing failure of the primary control rod.

(2) Initiate immediately whenever the primary control rod is initiated.

(3) Initiate after the primary control rod is initiated with a sufficient time delay to permit a normally functioning primary control rod to reach the end of its stroke, which would actually operate only in the event of the primary control rod not fully moving into the reactor core.

While not specifically illustrated, it is within the scope of this invention to modify the above described embodiment at least in the following areas:

(1) The reversible electromagnetic pump could be replaced by a pair of valves connecting to either separate pumps or to high and low pressure reservoirs.

(2) In order to assure buoyancy of the backup control rod, it can be made longer to include a float chamber at the lower or piston end.

(3) The backup control rod could consist merely of a sphere if the total control strength is not critical.

(4) The backup control rod and guide tube can be made a part of a fuel bundle, in which case the connection of the conduit to the electromagnetic pump would be broken when the fuel bundle is removed.

(5) A snubber can be incorporated between the primary and backup control rods to prevent impact, this being in the form of either a short projection on one rod which enters a recess in the other, or a spring secured to one of the rods.

(6) The piston at the lower end of the backup control rod can be replaced by a simple face seal.

(7) Upward motion of the backup control rod can be initiated by venting the cylinder about the piston to the reactor inlet plenum.

It is thus seen that the present invention has provided a unique safety feature for nuclear reactors by incorporating into the commonly used control rod system a back-up control rod system which is activated simultaneously with or upon failure of the primary control system to introduce a neutron absorption material into the reactor core for controlling the neutron level therein.

While a particular embodiment of the invention has been specifically illustrated and described, modifications in addition to those described will become apparent to those skilled in the art, and it is intended to cover in the appended claims all modifications as come within the spirit and scope of the invention.

I claim:

1. A backup control rod system for a nuclear reactor comprising: a guide tube adapted to be vertically positioned in a core of a reactor, said guide tube being closed at the lower end thereof, an upwardly opening cylinder disposed in said lower end of said guide tube, said closed end of said guide tube having an aperture therethrough and communicating with said cylinder, at least one fluid orifice extending through said guide tube closed end and spaced radially outward with respect to said aperture and said cylinder, a free floating control rod means positioned in said guide tube and including a projecting portion at the lower end thereof adapted to cooperate with said cylinder, said control rod means including a neutron poison adapted for controlling neutron level in an associated reactor core and being of a density less than density of associated coolant adapted to circulate through said guide tube, conduit means connected at one end to said guide tube closed end and in fluid communication with said cylinder through said aperture, and means connected to the other end of said conduit means capable of maintaining said free floating control rod means in the lower portion of said guide tube such that such projecting portion of said rod means is positioned in said cylinder, and capable of releasing said free floating control rod means from the position in the lower portion of said guide tube such that said rod means can float upwardly in said guide tube due to the buoyancy thereof.

2. The backup control rod system defined in claim 1, wherein said control rod maintaining means comprises a reversible electromagnetic pump.

3. The backup control rod system defined in claim 1, wherein said projecting portion of said free floating rod means defines a piston-like member.

4. The backup control rod system defined in claim 1, wherein said guide tube consists of a length approximately three times the thickness of an associated reactor core approximately one-third of said guide tube being adapted to be positioned in an associated reactor core with approximately one-third of said guide tube being adapted to extend above and below such an associated reactor core.

5. The backup control rod system defined in claim 4, in combination with a primary control rod having a driving means operatively connected to an upper portion thereof, said primary control rod including neutron absorbing material and operatively positioned in said guide tube such that under normal conditions of an associated reactor said primary control rod is maintained in the upper one-third of said guide tube while said free floating control rod means is normally maintained in the lower one-third of said guide tube.

6. The backup control rod system defined in claim 1, in combination with a primary control rod having a driving means adapted for moving said primary control rod toward and away from said free floating control rod means, said primary control rod including neutron absorbing material and adapted to control neutron level in an associated reactor core by movement toward and away from said free floating control rod means.

References Cited

UNITED STATES PATENTS

| 3,031,397 | 4/1962 | Fortescue et al. | 176—36 X |
| 3,375,170 | 3/1968 | Stubley | 176—36 X |

FOREIGN PATENTS

| 702,851 | 1/1965 | Canada. |
| 969,089 | 9/1964 | Great Britain. |

CARL D. QUARFORTH, Primary Examiner

H. E. BEHREND, Assistant Examiner